(12) United States Patent
Barton et al.

(10) Patent No.: US 9,333,906 B2
(45) Date of Patent: May 10, 2016

(54) VEHICLE GLAZING WITH LIGHT EMITTING DIODE DEVICE AND TRANSPARENT ENCAPSULANT

(71) Applicant: Pilkington Group Limited, Merseyside (GB)

(72) Inventors: Neil Barton, Merseyside (GB); Stephen Roland Day, Lancashire (GB)

(73) Assignee: Pilkington Group Limited, Lathom, Lancashire (GB)

( * ) Notice: Subject to any disclaimer, the term of this patent is extended or adjusted under 35 U.S.C. 154(b) by 76 days.

(21) Appl. No.: 14/471,551

(22) Filed: Aug. 28, 2014

(65) Prior Publication Data

US 2014/0369059 A1    Dec. 18, 2014

Related U.S. Application Data

(62) Division of application No. 11/547,608, filed as application No. PCT/GB2005/001213 on Mar. 30, 2005, now Pat. No. 8,833,989.

(30) Foreign Application Priority Data

Apr. 8, 2004   (GB) .................................. 0407951.3

(51) Int. Cl.
*B60Q 1/30* (2006.01)
*B60Q 1/26* (2006.01)
(Continued)

(52) U.S. Cl.
CPC ................ *B60Q 1/302* (2013.01); *B60Q 1/268* (2013.01); *B60Q 1/2696* (2013.01); *B60Q 1/44* (2013.01); *B60Q 3/0213* (2013.01); *F21Y 2101/02* (2013.01)

(58) Field of Classification Search
CPC ............ B60Q 1/30; B60Q 1/44; B60Q 1/268; B60Q 1/2696; B60Q 1/0213; F21S 48/218; F21S 48/215; F21Y 2101/02
See application file for complete search history.

(56) References Cited

U.S. PATENT DOCUMENTS

| 4,774,434 A | 9/1988 | Bennion |
| 5,099,401 A | 3/1992 | Kondo et al. |

(Continued)

FOREIGN PATENT DOCUMENTS

| DE | 42 06 959 A1 | 9/1993 |
| EP | 0 495 685 A1 | 7/1992 |

(Continued)

OTHER PUBLICATIONS

Search Report dated Sep. 15, 2004.

*Primary Examiner* — Robert May
(74) *Attorney, Agent, or Firm* — Buchanan Ingersoll & Rooney PC

(57) ABSTRACT

A vehicle glazing comprising a pane of glazing material having an exposed surface and a light emitting diode device a) other than an auxiliary stop lamp adhesively attached to the exposed surface of the pane of glazing material, or b) in the form of an auxiliary stop lamp adhesively attached to the exposed surface of the pane of glazing material, the lamp comprising a substrate having a functional surface on which a plurality of light emitting diodes is provided, and which is provided with a layer of transparent encapsulant to cover the light emitting diodes is disclosed. A process for the production of such a vehicle glazing comprising applying adhesive to a surface of the vehicle glazing, positioning the light emitting diode device with respect to the pane of glazing material and activating the adhesive is also disclosed.

19 Claims, 4 Drawing Sheets

(51) Int. Cl.
    *B60Q 3/02* (2006.01)
    *B60Q 1/44* (2006.01)
    *F21Y 101/02* (2006.01)

(56) References Cited

U.S. PATENT DOCUMENTS

| | | | |
|---|---|---|---|
| 5,103,382 | A | 4/1992 | Kondo et al. |
| 5,211,466 | A | 5/1993 | Jarocki et al. |
| 5,241,457 | A | 8/1993 | Sasajima et al. |
| 5,477,436 | A | 12/1995 | Bertling et al. |
| 5,490,049 | A | 2/1996 | Montalan et al. |
| 6,116,678 | A | 9/2000 | Beck |
| 6,270,236 | B1 | 8/2001 | Brussog |
| 6,499,870 | B1 | 12/2002 | Zwick et al. |
| 6,520,654 | B2 | 2/2003 | Angell et al. |
| 6,520,669 | B1 | 2/2003 | Chen et al. |
| 6,623,151 | B2 | 9/2003 | Pederson |
| 6,764,210 | B2 | 7/2004 | Akiyama |
| 6,860,620 | B2 | 3/2005 | Kuan et al. |
| 7,036,965 | B2 | 5/2006 | Dalton et al. |
| 7,048,422 | B1 | 5/2006 | Solomon |
| 7,072,096 | B2 | 7/2006 | Holman et al. |
| 7,473,012 | B1 | 1/2009 | Thomas |
| 2002/0196638 | A1 | 12/2002 | Stephens et al. |
| 2003/0016543 | A1 | 1/2003 | Akiyama |
| 2003/0052594 | A1 | 3/2003 | Matsui et al. |
| 2003/0072153 | A1 | 4/2003 | Matsui et al. |

FOREIGN PATENT DOCUMENTS

| | | |
|---|---|---|
| EP | 1 255 132 A1 | 11/2002 |
| EP | 1 277 615 A1 | 1/2003 |
| EP | 1 277 616 A1 | 1/2003 |
| EP | 1 437 215 A1 | 7/2004 |
| FR | 2 715 908 A1 | 8/1995 |
| FR | 2 772 695 A1 | 6/1999 |
| WO | WO 03084810 A1 | 10/2003 |
| WO | WO 2004/009349 A1 | 1/2004 |

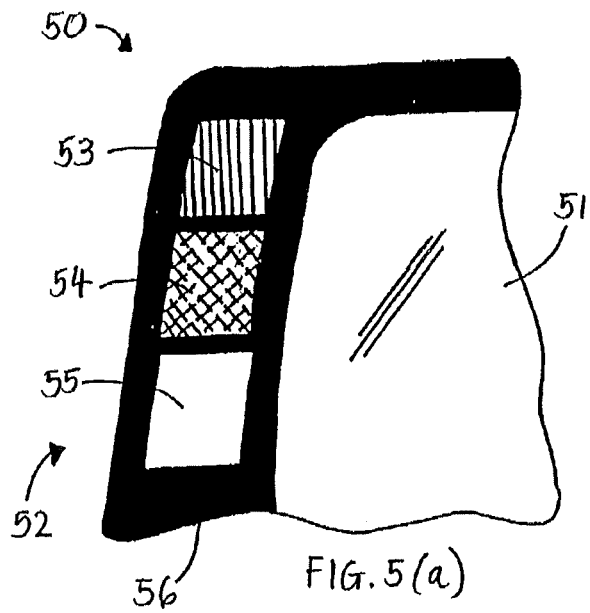
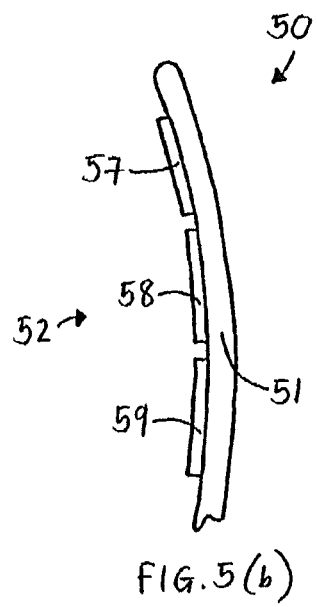
FIG. 5(a)          FIG. 5(b)
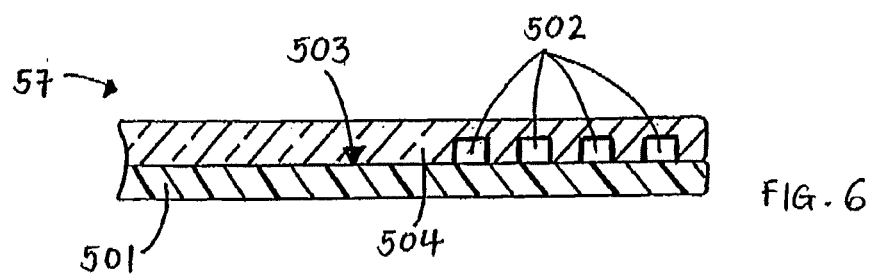
FIG. 6
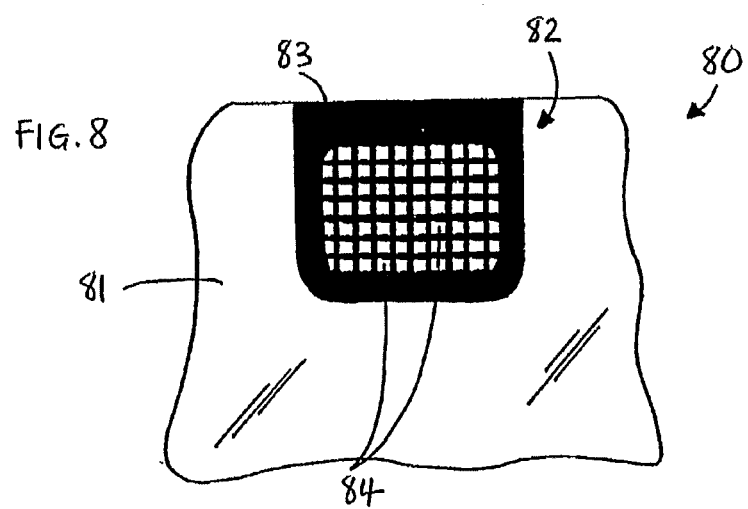
FIG. 8

VEHICLE GLAZING WITH LIGHT EMITTING DIODE DEVICE AND TRANSPARENT ENCAPSULANT

CROSS REFERENCE TO RELATED APPLICATION

This application is a divisional of U.S. patent application Ser. No. 11/547,608, filed Oct. 4, 2006, which is a National Stage of PCT/GB2005/001213, filed Mar. 30, 2005, which claims priority under 35 U.S.C. §119 to Great Britain Patent Application No. 0407951.3, filed Apr. 8, 2004, the disclosures of all of which are incorporated herein by reference in their entirety.

FIELD OF THE INVENTION

The present invention relates to a vehicle glazing which incorporates at least one light emitting diode, more particularly to an automotive vehicle glazing incorporating a light emitting diode device, and to a process for the production of such a vehicle glazing.

DESCRIPTION OF RELATED ART

A vehicle backlight (a rearward facing window in a vehicle) comprising a single pane of glass and an auxiliary stop lamp, which includes one or more light emitting diodes in its construction, mounted on one of the surfaces of the pane of glass is known. European patent application EP 1 277 615 A1 describes an auxiliary stop lamp (also known as a "high mounted stop lamp" or "third brake light") which is arranged on the inner surface of a vehicle rear-window glazing panel. The stop lamp comprises a flexible substrate (of a thickness between 0.2 and 0.9 mm) provided with a plurality of 10 mm square openings (purportedly to increase driver visibility in the region of the stop lamp) and an array of light emitting diode chips which are substrate is bonded to the glazing panel with double-sided adhesive tape and the light emitting diode chips are covered with individual covering members which are made from a transparent synthetic resin material and which fit between the openings in the substrate.

Vehicle backlights may be complex in shape (and currently there is a growing trend towards greater complexity). A backlight may have curvature in two or more directions which may make it difficult to fix a flat substrate to a surface of the backlight. Although the stop lamp in EP '615 is described as being made from a flexible substrate, the thickness of the substrate may in fact impair its flexibility, especially if the stop lamp were to be arranged on a backlight having complex curvature, to which the substrate would need to conform. Stress introduced into the substrate as it is bent to such a curvature would be likely to weaken the adhesion of the substrate to the glazing, resulting in an imperfect vehicle glazing in need of repair.

A further problem with the stop lamp described in EP '615 results from the size of the openings in the substrate; the stop lamp will typically have a relatively large overall surface area (as compared to conventional high mounted stop lamps) in order to accommodate enough light emitting diode chips for the stop lamp to function effectively (for example, to be bright enough for drivers of other vehicles to see). Despite the presence of openings in the substrate however, such a "large" stop lamp would nonetheless obtrude the rear-view vision of the driver of a vehicle which incorporates said stop lamp on its backlight.

A laminated vehicle glazing panel comprising two glass plies and a plastics ply, having at least one light emitting diode laminated therebetween is also known. International patent application WO 2004/009349 A1 describes such a laminated glazing wherein one or more light emitting diodes are mounted on a flexible circuit board. The light emitting diodes may be used as indicia in a windscreen which is installed in a vehicle to convey information to the vehicle's occupants about, for example, the speed of the vehicle.

In the automotive vehicle industry, a vehicle windscreen must be fitted as a laminated glazing for safety reasons. The remainder of the openings in a vehicle to be glazed are usually fitted with toughened glass, although laminated sidelights (windows in the side of a vehicle) are becoming increasingly popular in vehicles at the luxury end of the market, and use of light emitting diode devices with toughened vehicle glazings is not current practice.

It is advantageous to provide a vehicle glazing with one or more light emitting diode devices which improve the utility of the glazing because, as vehicle designs are constantly evolving, it enables greater freedom in the design of vehicles, especially with regard to the relationship between the glazing in a vehicle and the body of the vehicle itself. However, until now, light emitting diode devices have only been used as part of an auxiliary stop lamp attached to a backlight (this being the only lamp where it has been considered, and where it has subsequently been possible, to replace conventionally used incandescent light bulbs with light emitting diodes), or laminated in a windscreen where they function as indicia.

SUMMARY

The present inventor has, with the invention to be described herein, made technical advances regarding vehicle glazings which incorporate a light emitting diode device, and has thereby increased the number of opportunities for exploiting the benefits of a glazing incorporating a light emitting diode device. In one particular aspect, the present inventor has devised a novel backlight incorporating an auxiliary stop lamp (comprising a light emitting diode device) which does not suffer from the problems that are associated with the glazings presently known.

According to a first aspect of the present invention there is provided a vehicle glazing comprising:

a pane of glazing material having an exposed surface, and a light emitting diode device other than an auxiliary stop lamp adhesively attached to the exposed surface of the pane of glazing material.

The vehicle glazing may be used as a windscreen, a sidelight, a rooflight (a window in the roof of a vehicle, which may be a conventional "sun-roof" or a full area rooflight) or a backlight. By "an exposed surface" of a pane of glazing material is meant a surface that is exposed to the environment surrounding the pane of glazing material during normal use of the pane of glazing material; for the avoidance of doubt, a single pane of glazing material typically has two exposed surfaces (one on each face of the pane) whereas a laminated glazing comprising two plies of glazing material typically has two exposed surfaces (the two external surfaces of the laminate) and two unexposed surfaces (the two internal surfaces of the laminate). The light emitting diode device is ordinarily attached to the innermost exposed surface of the pane of glazing material ("innermost" with respect to the vehicle into which the glazing is to be installed); there is no need for the device to be laminated between two plies of glazing material as is often the case in the prior art and thus the restriction imposed by lamination on the thickness of the device (which should be less than 1 mm thick to achieve satisfactory lamination) is removed. Furthermore, attachment of a light emitting diode device to a pane of glazing material is a much simpler process than lamination of the device between two panes of glazing material.

The pane of glazing material comprised in the vehicle glazing may be a pane of a plastics material, for example polycarbonate, or a single pane of glass, which may be toughened. Moreover, it may be the inner ply of a laminate construction (i.e. that ply of a laminate which will be on the interior of the vehicle into which the glazing may be installed).

The light emitting diode device typically comprises a substrate having a functional surface on which at least one light emitting diode is provided. The substrate is preferably flexible so that it is able to conform to the contours of the pane of glazing material to which it is attached; ordinarily the substrate will be in the form of a flexible circuit board. By "a functional surface" is meant that surface of the substrate on which electrically conductive pathways are located. A substrate may be more easily adhered to the pane of glazing material than individual light emitting diodes; this is especially true when more than one light emitting diode is required. When a plurality of light emitting diodes are present, it may be much simpler to create an array (which may involve a particular pattern) on a substrate which is subsequently adhered to the pane of glazing material, than to create an array in situ on the pane.

Advantageously, the functional surface of the substrate may be provided with a layer of transparent encapsulant which covers the at least one light emitting diode. The encapsulant usually serves to protect the at least one light emitting diode which it covers from physical damage and from the external environment, thereby increasing both the durability and the lifetime of the light emitting diode device. When a plurality of light emitting diodes are present, the layer of transparent encapsulant may cover all the light emitting diodes. The encapsulant is preferably transparent so as to allow radiation emitted by the at least one light emitting diode to be transmitted through it.

According to a second aspect of the present invention there is provided a vehicle glazing comprising:
a pane of glazing material having an exposed surface, and
a light emitting diode device in the form of an auxiliary stop lamp adhesively attached to the exposed surface of the pane of glazing material,
said lamp comprising a substrate having a functional surface on which a plurality of light emitting diodes is provided,
wherein the functional surface is provided with a layer of transparent encapsulant which covers the light emitting diodes.

The substrate on which the stop lamp is based is typically continuous, i.e. there are no openings in it, and it may be of a thickness between 0.1 and 0.2 mm, for example. The stop lamp typically has a surface area less than 150 cm$^2$. This means that the stop lamp may be relatively small in size (compared to, for example, the prior art stop lamp described earlier) and thus less obtrusive to rear-view vision through a backlight on which such a stop lamp is mounted, and it may be bent and flexed to conform and adhere to many differently curved glazings. By providing a layer of transparent encapsulant to cover the light emitting diodes, the light emitting diodes may be well protected from their surrounding environment, for example moisture which may condense on the surface of the glazing to which the stop lamp is adhered and which may otherwise damage the integrity of one or more of the light emitting diodes.

Preferably the encapsulant referred to in both the first and second aspects of the present invention functions as an adhesive. Generally, neither the substrate nor light emitting diodes will by themselves adhere to a pane of glazing material. It is desirable (though not essential) that the transparent encapsulant has a dual-function: protection of light emitting diodes and means to attach the light emitting diode device to the pane of glazing material because this further simplifies the construction of the vehicle glazing. When the encapsulant functions as an adhesive, the light emitting diode device may be attached to the pane of glazing material with the light emitting diodes facing out of the vehicle into which the glazing is to be mounted; lighting functions on the exterior of the vehicle (for example indicator lights) may thus be achieved in this way.

With regard to the vehicle glazing according to the second aspect of the present invention, having the encapsulant function as the adhesive means that this glazing has a further advantage over the known prior art glazing which incorporates an auxiliary stop lamp, namely that adhesion over the full area of the encapsulant is likely to be more durable (for example when the substrate is put under stress when flexed) than the strips of double-sided adhesive tape that are used to fix the substrate to the glazing panel in the prior art. Thus a vehicle glazing according to the second aspect of the present invention is likely to have a longer lifetime without repair than the aforementioned prior art glazing.

Alternatively to the layer of encapsulant functioning as an adhesive, a layer of transparent adhesive may be provided to cover the layer of encapsulant. During construction of a vehicle glazing, the layer of encapsulant or adhesive may be provided on the surface of the pane of glazing material to which the light emitting diode device is to be attached, or it may be provided on the light emitting diode device itself. It is preferred that the layer of adhesive is transparent so as to allow radiation emitted by the at least one light emitting diode to be transmitted through it.

Further alternatively, the substrate referred to in the first and second aspects of the invention may have a non-functional surface on which adhesive may be provided. By "a non-functional surface" is meant that surface of the substrate which is on the opposite side of the board to the functional surface referred to earlier; typically there are no electrically conductive pathways on the non-functional surface. When the non-functional surface of the substrate is provided with adhesive, the light emitting diode device may be attached to the pane of glazing material with the light emitting diodes facing into the vehicle into which the glazing is to be mounted; lighting functions in the interior of the vehicle (for example courtesy lighting) may thus be achieved in this way. The colour of the adhesive may be chosen to as to obscure the light emitting diode device when the glazing is viewed from the exterior of the vehicle into which it may be installed.

Advantageously the adhesive (whether it be a layer of encapsulant functioning as an adhesive, a layer of adhesive covering a layer of encapsulant, or a layer of adhesive provided on the non-functional surface of a light emitting diode device) includes an emitted-light dispersant material. Light emitting diodes are discrete point sources of light. In certain circumstances it may be that more diffuse light is desired (for example, in courtesy or ambient lighting applications) in which case a dispersant material may be included in the adhesive to scatter the emitted light within the adhesive itself. The same effect may also be achieved if the at least one light emitting diode is covered with a lens, for example one designed to increase the angular spread of the emitted light, another type of diffuser material, for example an epoxy resin, an acrylate or a methacrylate, or, where the encapsulant acts as the adhesive, if a translucent material is used, for example silicone.

The light emitting diode device may be provided with at least two light emitting diodes and each diode may emit light of a different wavelength. Thus within an array of light emitting diodes, there may be many different wavelengths of radiation emitted (thus many different colours of emitted light observed). However, the number of light emitting diodes emitting radiation of a certain wavelength need not be equal: for example, half the total number of diodes may emit radiation of wavelength $\lambda_1$, a quarter may emit at $\lambda_2$ whilst the final quarter may emit at $\lambda_3$.

To maximise the intensity of observed emitted light, the light emitting diode device is desirably provided with emitted-light reflection means. Radiation is usually emitted from a light emitting diode in all directions; to make full use of the radiation that is emitted towards the substrate to which the at least one light emitting diode is attached, emitted-light reflection means may be provided on the functional or non-functional surface of the substrate (the latter assumes that the substrate is itself composed of a transparent material).

The pane of glazing material comprised in the vehicle glazing is preferably provided with means to obscure at least a portion of the light emitting diode device. These obscuration means may include one or more un-obscured areas: an area may allow light emitted from a whole array of light emitting diodes to be transmitted through it, or it may correspond in size to an individual light emitting diode such that only the light emitted by a single diode may be transmitted through that particular area.

The light emitting diode devices hereinbefore described will usually provide a uniform light output via a simple on-off function. However, with an array of light emitting diodes it may be advantageous to vary the intensity of light across the array, or to alter the brightness across the array, or to sequentially switch the light emitting diodes on/off according to a pre-determined pattern. Intensity variation across an array may be achieved, for example by having a particular pattern which determines the spatial distribution of individual light emitting diodes, by varying the drive voltage used to power the light emitting diode device, by using multiple coloured light emitting diodes within an array, or by employing multiple circuits corresponding to particular groups of light emitting diodes within an array. These techniques may facilitate a fade in-fade out effect, or a pulsing effect, of the light emitted by an array of light emitting diodes, and may also compensate for angular intensity effects (by providing a uniform observed intensity of light over the majority of positions of an observer relative to the light emitting diode device).

The pane of glazing material comprised in the vehicle glazing described above may have a complex curvature. Complex curvature means that a pane of glazing material has curvature in two orientations which are known as "cross curvature" (curvature along a vertical centreline which extends between the top and bottom edges of the pane (referenced when the glazing is installed in a vehicle)) and "side-to-side curvature" (curvature along a horizontal centreline which extends between the two side edges of the pane (referenced when the glazing is installed in a vehicle)).

When the glazing is to be used as a windscreen, the curvature of the pane of glazing material is usually defined in terms of the cross curvature alone. A windscreen may have a cross curvature greater than 15 mm (which may be described as "semi-complex") and preferably greater than 25 mm (where it may be described as "complex"). If the cross curvature is greater than 30 mm, the windscreen may be described as "very complex".

When the glazing is to be used as a backlight, the curvature of the pane of glazing material may be defined in terms of a parameter X which is the product of the radius of the cross curvature and the radius of the side-to-side curvature at any point on the pane of glazing material, i.e. the double curvature of the pane. A backlight may have a value of X less than $10 \times 10^5$ mm$^2$ (which may be described as "semi-complex") and preferably less than $5 \times 10^5$ mm$^2$ (where it may be described as "complex"). If the value of X is less than $1 \times 10^5$ mm$^2$, the backlight may be described as "very complex".

According to a further aspect of the present invention there is provided a process for the production of a vehicle glazing according to either the first or second aspects of the present invention comprising:

applying adhesive to a surface of the vehicle glazing,
positioning the light emitting diode device with respect to the pane of glazing material, and
activating the adhesive.

The adhesive may be applied to the surface of the pane of glazing material to which the light emitting diode device is to be attached, and in the appropriate location. Alternatively the adhesive may be applied to the device to cover the light emitting diodes themselves (in which case the adhesive is also the transparent encapsulant), to cover the layer of transparent encapsulant or to the non-functional surface of the device. For the avoidance of doubt "a surface of the vehicle glazing" includes both a surface of a pane of glazing material used as the basis of the glazing and a surface of the light emitting diode device. Preferably, the adhesive properties of the adhesive are not active at room temperature conditions. Subsequent to positioning the light emitting diode device with respect to the pane of glazing material, the adhesive may be activated by the application of temperature, pressure, radiation of a particular wavelength, or a combination of any of these.

The adhesive used to attach the light emitting diode device to a surface of the vehicle glazing may be applied as a fluid layer to the light emitting diode device. Spread of the fluid adhesive may be controlled by a simple mould into which the light emitting diode may have been placed prior to application of the adhesive. When the layer of transparent encapsulant functions as the adhesive, the fluid layer may be applied directly to the functional surface of the substrate of the light emitting diode device where it may make intimate contact with the light emitting diodes on the substrate by flowing into all the space available.

Alternatively the adhesive used to attach the light emitting diode device to a surface of the vehicle glazing may be applied as a fluid layer to an exposed surface of the pane of glazing material. Spread of the fluid adhesive may be controlled by a simple mould which is positioned on the pane prior to application of the adhesive.

Typically the fluid adhesive is semi-cured prior to the step of positioning the light emitting diode device on the exposed surface of the pane of glazing material (and also prior to removal of the mould which may be used to control the spread of the fluid adhesive). In its semi-cured state, the adhesive may have achieved a minimum level of tackiness which may be used to temporarily hold the light emitting diode device in place on the pane of glazing material before the adhesive is fully activated and the device is firmly attached to the pane.

A vehicle glazing according to the first aspect of the present invention may be used as a rooflight. When used as such, the light emitting diode device thereon is preferably in the form of an illuminator, whereby the light emitting diode device provides illumination. Alternatively, said vehicle glazing may be used as a backlight wherein the light emitting diode device is in the form of a rear lamp cluster.

A vehicle glazing according to the second aspect of the present invention may also be used as a backlight (the light emitting diode device thereon being in the form of an auxiliary stop lamp).

According to another aspect of the present invention there is provided a vehicle comprising a rear window pane, a pane of glazing material distinct from the rear window pane, the pane of glazing material having an exposed surface, and a light emitting diode device attached to the exposed surface of the pane of glazing material.

BRIEF DESCRIPTION OF THE DRAWINGS

For a better understanding, the present invention will now be more particularly described by way of non-limiting example with reference to, and as shown in, the accompanying drawings wherein:

FIG. 5(a) is a partial plan view of a backlight (a second embodiment of a vehicle glazing according to the first aspect of the present invention), whilst FIG. 5(b) is a side view of the same, FIG. 6 is a cross-sectional view of a light emitting diode device which may be used with the vehicle glazing shown in FIGS. 5(a) and 5(b), FIGS. 7(a), (b) and (c) are cross-sectional views of alternative light emitting diode devices which may be used with a vehicle glazing of the present invention, and FIG. 8 is a partial plan view of a backlight according to the second aspect of the present invention.

DETAILED DESCRIPTION OF THE PREFERRED EMBODIMENTS

Figure 1:
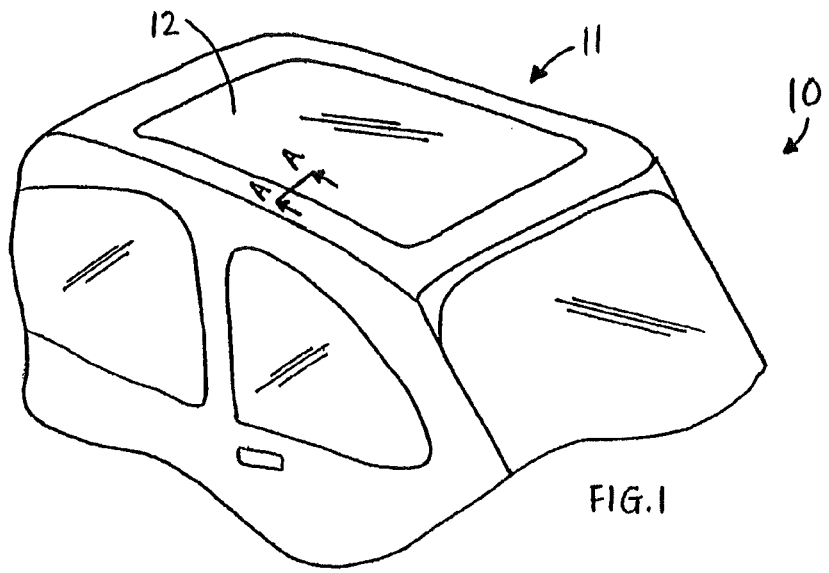
FIG. 1 is a partial, isometric view of a vehicle possessing a full-area rooflight.

Vehicle 10 shown in FIG. 1 has a rooflight 11 which comprises pane of glazing material in the form of a pane of glass 12. Rooflight 11 is an exemplary first embodiment of a vehicle glazing according to the first aspect of the present invention. It is shown in more detail in FIG. 2, which illustrates the relative position of vehicle body 10 and rooflight 11. To pane of glass 12 (which is comprised in rooflight 11) light emitting diode device 13, in the form of an illuminator which provides for example courtesy lighting, is attached. Arrows labelled 14 indicate that light is emitted from light emitting diode device 13 into the vehicle of FIG. 1.

Figure 2:
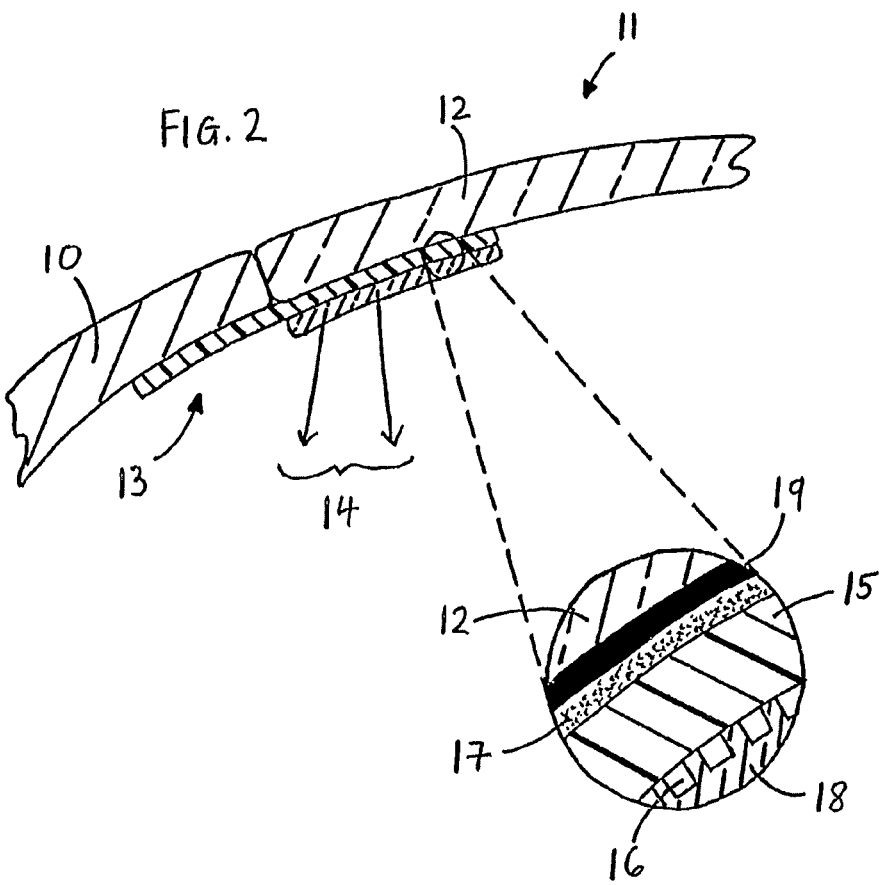
FIG. 2 is a section along line A-A of FIG. 1 showing a first embodiment of a vehicle glazing according to the first aspect of the present invention.

The magnified section of FIG. 2 shows that light emitting diode device 13 comprises substrate 15, in the form of a flexible circuit board, on which a number of light emitting diodes 16 are mounted, and which are covered by layer of transparent encapsulant 18, for example an epoxy resin, acrylate, methacrylate or silicone, none of which possess any adhesive properties once fully cured. Layer of transparent encapsulant 18 is typically applied to light emitting diode device 13 in a fluid form by pouring it over light emitting diodes 16 and substrate 15. Spread of the fluid material may be controlled by a simple mould into which light emitting diode device may have been placed prior to application of encapsulant 18. Encapsulant 18 may then be fully cured before the mould is removed. On the opposite side to light emitting diodes 16, substrate 15 is provided with adhesive 17 (for example, polyurethane, an acrylic or epoxy resin). Pane of glass 12 is provided with means to obscure 19, in the form of an obscuration band, at least a portion of light emitting diode device 13. The obscuration band is usually made of black, fired ceramic ink. Substrate 15 is adhered to obscuration means 19 on pane of glass 12 by adhesive 17.

Figure 3A:
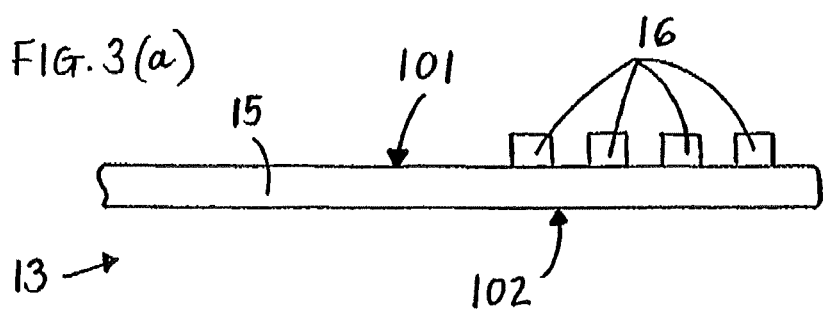
FIG. 3(a) is a side view of a light emitting diode device which may be used in the present invention, whilst
Figure 3B:
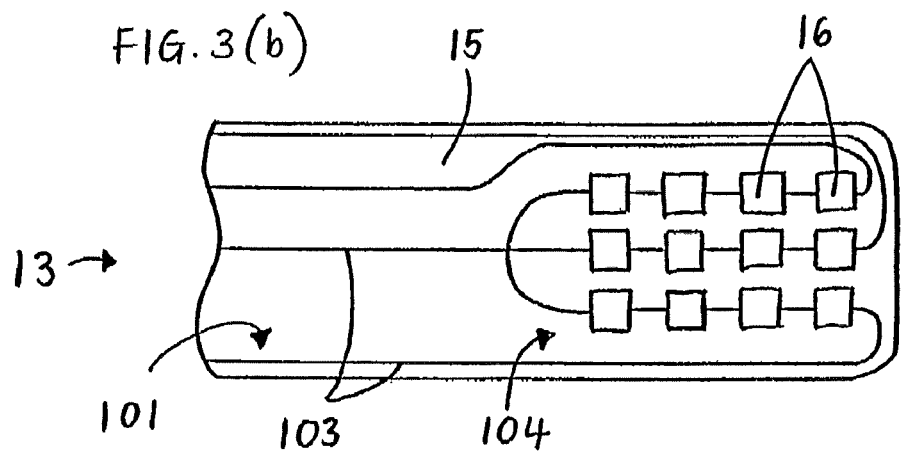
FIG. 3(b) is a plan view of the same.

Light emitting diode device 13 illustrated in FIGS. 3(a) and 3(b) comprises substrate 15, in the form of a flexible circuit board, and a number of light emitting diodes 16. Substrate 15 has a functional surface 101 and a non-functional surface 102 (both shown in FIG. 3(a)). As shown in FIG. 3(b) functional surface 101 is provided with conductive tracks 103, in the form of etched copper lines, which provide electrical power to an array 104 of light emitting diodes positioned on functional surface 101. Light emitting diodes 16 may be attached to conductive tracks 103 by a solder (not shown) or by a conductive adhesive (not shown).

Figure 4:
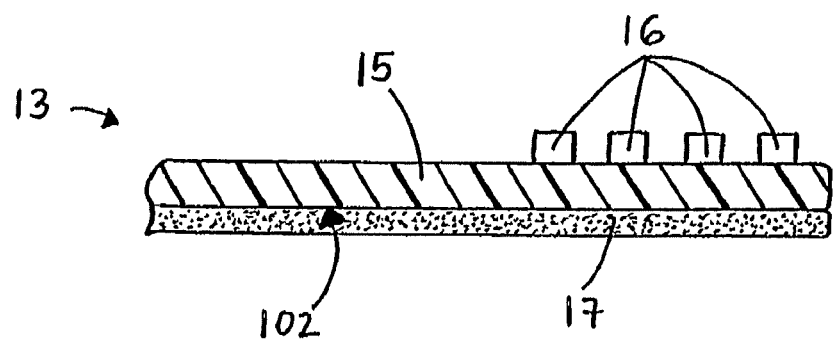
FIG. 4 is a cross-sectional view of a light emitting diode device which may be used with the vehicle glazing shown in FIG. 2.

FIG. 4 depicts a light emitting diode device 13 which may be used with the vehicle glazing shown in FIG. 2. Said device comprises a substrate 15, in the form of a flexible circuit board, on which a number of light emitting diodes 16 are mounted. Non-functional surface 102 of substrate 15 is provided with adhesive 17 (for example polyurethane, an acrylic or epoxy resin), with which light emitting diode device 13 may be adhered to a pane of glass.

Backlight 50 shown in FIGS. 5(a) and 5(b) is an exemplary second embodiment of a vehicle glazing according to the first aspect of the present invention, and it comprises pane of glazing material in the form of a pane of glass 51 which is provided with rear lamp cluster 52. The view shown in FIG. 5(a) is of that surface of backlight 50 which would be on the exterior of a vehicle into which it may be installed. Means to obscure 56, in the form of an obscuration band, at least part of rear lamp cluster 52 from external view (i.e. the view from outside the vehicle into which backlight 50 is installed) is provided around the periphery of pane of glass 51 (only shown in FIG. 5(a)).

Obscuration means 56 includes un-obscured areas through which light from the arrays 53,54,55 of light emitting diodes may be emitted. Array 53 comprises diodes which emit light in the red part of the visible spectrum; this array is intended to be used as a stop/brake lamp and/or tail-lamp. Array 54 comprises diodes which emit light in the orange/amber part of the visible spectrum; this array is intended to be used as a signalling lamp, while array 55 comprises diodes which emit white light; this array is intended to be used as a reversing lamp (to show that the vehicle is in reverse gear).

FIG. 5(b) illustrates that each of these arrays is provided on a separate light emitting diode device 57 (red light), 58 (amber light), 59 (white light), each of which is attached to the surface of pane of glass 51 which would face into a vehicle into which backlight 50 may be installed. It is equally possible, however, that all three arrays 53,54,55 are provided on a single light emitting diode device.

Light emitting diode device 57 shown in FIG. 6 may be used with the vehicle glazing shown in FIGS. 5(a) and 5(b) as a red light source. Device 57 comprises substrate 501, in the form of a flexible circuit board, having a functional surface 503 on which a number of light emitting diodes 502 are attached. Layer of transparent encapsulant 504 (for example polyurethane, an acrylic or epoxy resin) covers functional surface 503 and thus light emitting diodes 502. In this example, transparent encapsulant 504 also acts as an adhesive, with which light emitting diode device 57 may be attached to a pane of glass. It is equally possible, however, that transparent encapsulant 504 does not also act as an adhesive, and instead a layer of adhesive (not shown) is provided to cover layer of encapsulant 504 and to adhere device 57 to a pane of glass.

Figure 7A:
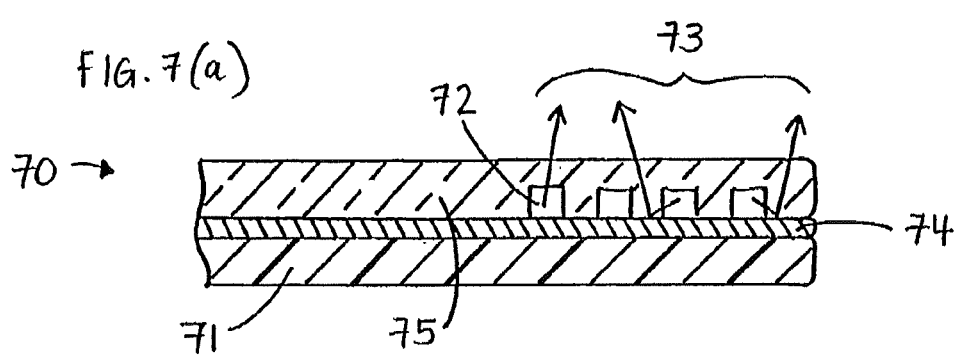
Figure 7B:
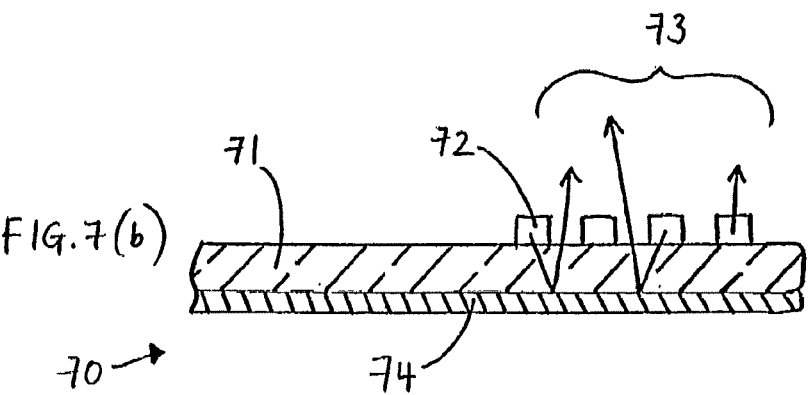
Figure 7C:
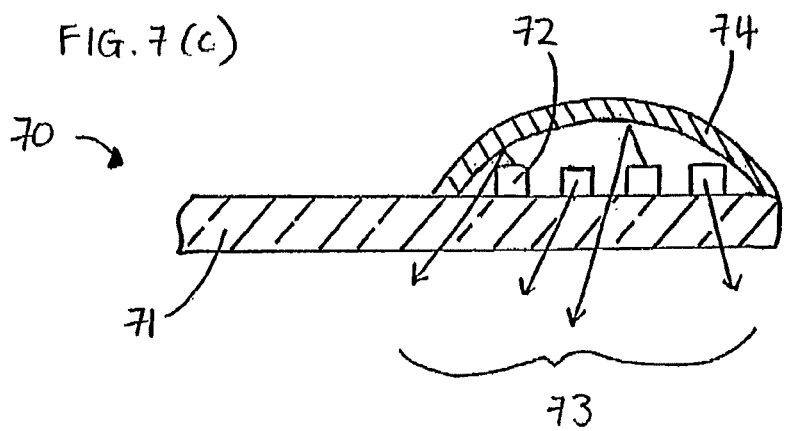

FIGS. 7(a), 7(b) and 7(c) illustrate three variations of a light emitting diode device 70 which includes emitted-light reflection means 74. In FIGS. 7(a) and 7(b), emitted-light reflection means 74 is in the form of a reflective film (for example an aluminium or silver coated polyester); in FIG. 7(c) it is in the form of a reflector.

Device 70 shown in FIG. 7(a) is provided with reflection means 74 on the same surface of substrate 71 as that on which light emitting diodes 72 are mounted. Thus light emitted in the direction of substrate 71 is reflected away from it, such that the observed intensity of emitted light (in a direction away from substrate 71) is maximised. Both reflection means 74 and light emitting diodes 72 are covered with layer of transparent encapsulant 75 (which may or may not also act as an adhesive). Arrows labelled 73 indicate that both emitted light and reflected light travels through layer of transparent encapsulant 75 (hence the desirability of transparency).

Device 70 shown in FIG. 7(b) is provided with reflection means 74 on the opposite surface of transparent substrate 71 as that on which light emitting diodes 72 are mounted. Thus light emitted in the direction of transparent substrate 71 travels through it before being reflected back through it and away from it—again, such that the observed intensity of emitted light (in a direction away from substrate 71) is maximised. Although not shown, both reflection means 74 and light emitting diodes 72 may be covered with a layer of transparent encapsulant (which may or may not also act as an adhesive). Arrows labelled 73 indicate light emitted in the direction of transparent substrate 71 must travel through it to reach reflection means 74, hence the desirability that substrate 71 be transparent.

FIG. 7(c) shows device 70 is provided with reflection means 74 which covers light emitting diodes 72. Light emitted in the direction of transparent substrate 71 travels through it, whereas light emitted in a direction away from transparent substrate 71 is reflected back towards and through substrate 71 by reflection means 74. Although not shown, the surface of substrate 71 opposite to that on which light emitting diodes 72 are located may be provided with a layer of transparent adhesive, with which device 70 may be attached to a pane of glass. Arrows labelled 73 indicate that both emitted light and reflected light travels through substrate 71 (hence the desirability of transparency).

Backlight 80 shown in FIG. 8 is an exemplary vehicle glazing according to the second aspect of the present invention, and it comprises pane of glazing material in the form of a pane of glass 81 which is provided with auxiliary stop lamp 82, in the form of a light emitting diode device (not shown as it is positioned on the opposite surface of backlight 80 to that shown, however, a device such as the one depicted in FIG. 6 could be used). The view shown in FIG. 8 is of that surface of backlight 80 which would be on the exterior of a vehicle into which it may be installed.

Means to obscure 83, in the form of an obscuration band, at least part of auxiliary stop lamp 82 from external view (i.e. the view from outside the vehicle into which backlight 80 is installed) is provided at least over the area of pane of glass 81 where auxiliary stop lamp 82 is positioned. Obscuration means 83 includes a plurality of un-obscured areas 84 corresponding in number to the number of light emitting diodes present in the light emitting diode device, through which light from said diodes may be emitted. The diodes emit light in the red part of the visible spectrum (because the device is being used as an auxiliary stop lamp).

The flexible circuit board referred to herein is usually made of a polymeric material which is between 0.1 and 0.2 mm in thickness. Two materials in particular are often used for this purpose, namely polyimide and polyester. Polyimide is usually yellow to brown in colour and is beneficial to use because it is able to withstand the soldering process by which the one or more light emitting diodes may be connected to the conductive tracks. Polyester may be transparent or translucent, which is advantageous as the circuit board may then have high light transmission and low visibility. However, because polyester has a tendency to degrade when solder is used to attach the one or more light emitting diodes to the conductive tracks, use of a conductive adhesive rather than solder is preferable.

When an array of light emitting diodes is present on a light emitting diode device, the individual light emitting diodes are usually spaced apart from another. The distance of the spacings is generally determined by the size of the light emitting diodes used, the surface area of the substrate to which they are to be attached and the level of illumination that is required of the device. Spacings of less than 1 mm or up to tens of millimeters are possible, however the limitations of the manufacturing process used to attach the light emitting diodes to the substrate will often determine the minimum distance achievable.

A preferred process for the production of a vehicle glazing according to the invention is as follows. A light emitting diode device comprising a substrate, in the form of a flexible circuit board, on which one or more light emitting diodes are mounted (and optionally a layer of transparent encapsulant, for example fully cured (hence non-adhesive) polyurethane, acrylic or epoxy resin, is provided) has a layer of adhesive (for example, polyurethane, an acrylic or epoxy resin) applied to it. When a rooflight is manufactured, the layer of adhesive is applied on the non-functional surface of the substrate and covers the entire surface. When a backlight is manufactured, the layer of adhesive is applied so as to cover the functional surface of the substrate (including the light emitting diodes). The device is then positioned on the pane of glazing material and temporarily held in place, for example by means of the natural tackiness of the adhesive at room temperature, or use of a removable tape, whilst the adhesive is activated. The adhesive curing regime is dependent on the material used: a thermoplastic polyurethane may require a temperature of greater than 100° C. and 10 bars of pressure, a silicone may only require application of moisture to it before it sets under atmospheric conditions, a two-part epoxy resin would rely on the chemical reaction that occurs when the two parts are mixed, whilst an acrylic may include a photoinitiator which requires exposure to UV radiation (the wavelength of radiation required being dependent upon the nature of the photoinitiator included in the acrylic) to be cured. Once cured, the resultant glazing is ready for installation into a vehicle.

The invention claimed is:

1. A vehicle glazing comprising:
   a pane of glazing material having an exposed surface, and
   a light emitting diode device in the form of an auxiliary stop lamp,
   said lamp comprising a substrate having a functional surface on which electrically conductive pathways are located and on which a plurality of light emitting diodes is provided, wherein the functional surface, including its outermost periphery, is provided with a layer of transparent encapsulant which covers the light emitting diodes and which contacts the exposed surface to adhesively attach the light emitting diode device to the exposed surface, and wherein said plurality of light emitting diodes are disposed between said substrate and said pane of glazing material.

2. A vehicle glazing as claimed in claim 1 wherein the adhesive includes an emitted-light dispersant material.

3. A vehicle glazing as claimed in claim 1 wherein the light emitting diode device is provided with at least two light emitting diodes, each emitting light of a different wavelength.

4. A vehicle glazing as claimed in claim 1 wherein the light emitting diode device is provided with emitted-light reflection means.

5. A vehicle glazing as claimed in claim 1 wherein the light emitting diode device is provided with an array of light emitting diodes and the intensity of light emitted by the diodes is variable across the array.

6. A vehicle glazing as claimed in claim 1 wherein the pane of glazing material has a complex curvature.

7. A vehicle glazing comprising:
a pane of glazing material having an exposed surface, and
a light emitting diode device comprising at least one light emitting diode provided on a functional surface of a substrate and electrically connected to conductive tracks provided on the functional surface of the substrate,
wherein a layer of transparent encapsulant in contact with both the exposed surface of the pane of glazing material and the functional surface of the substrate covers the at least one light emitting diode,
wherein the substrate is fixed to the exposed surface of the pane of glazing material via their mutual contact with the layer of transparent encapsulant, and
wherein the light emitting diode device is positioned to emit light in a direction towards the exposed surface of the pane of glazing material.

8. A vehicle glazing as claimed in claim 7 wherein the adhesive includes an emitted-light dispersant material.

9. A vehicle glazing as claimed in claim 7 wherein the light emitting diode device is provided with at least two light emitting diodes, each emitting light of a different wavelength.

10. A vehicle glazing as claimed in claim 7 wherein the light emitting diode device is provided with emitted-light reflection means.

11. A vehicle glazing as claimed in claim 7 wherein the light emitting diode device is provided with an array of light emitting diodes and the intensity of light emitted by the diodes is variable across the array.

12. A vehicle glazing as claimed in claim 7 wherein the pane of glazing material has a complex curvature.

13. A vehicle glazing comprising:
a pane of glazing material having an exposed surface, and
a light emitting diode device comprising at least one light emitting diode provided on a functional surface of a substrate,
wherein a layer of transparent encapsulant covers the at least one light emitting diode, and
wherein the substrate and the layer of transparent encapsulant are adhesively attached to the exposed surface of the pane of glazing material by a layer of transparent adhesive interposed between the layer of encapsulant and the exposed surface of the pane of glazing material.

14. A vehicle glazing as claimed in claim 13 wherein the adhesive includes an emitted-light dispersant material.

15. A vehicle glazing as claimed in claim 13 wherein the light emitting diode device is provided with at least two light emitting diodes, each emitting light of a different wavelength.

16. A vehicle glazing as claimed in claim 13 wherein the light emitting diode device is provided with emitted-light reflection means.

17. A vehicle glazing as claimed in claim 13 wherein the light emitting diode device is provided with an array of light emitting diodes and the intensity of light emitted by the diodes is variable across the array.

18. A vehicle glazing as claimed in claim 13 wherein the pane of glazing material has a complex curvature.

19. A vehicle glazing as claimed in claim 13 wherein the layer of transparent encapsulant is disposed between the substrate and the layer of transparent adhesive.

\* \* \* \* \*